(12) United States Patent
Steil et al.

(10) Patent No.: US 7,204,149 B1
(45) Date of Patent: Apr. 17, 2007

(54) APPARATUS FOR INDICATING PRESSURE

(75) Inventors: Frederick G. Steil, Lake Orion, MI (US); Trevor Pruden, Windsor (CA)

(73) Assignee: D-M-E Company, Madison Heights, MI (US)

( * ) Notice: Subject to any disclaimer, the term of this patent is extended or adjusted under 35 U.S.C. 154(b) by 6 days.

(21) Appl. No.: 11/296,546

(22) Filed: Dec. 7, 2005

(51) Int. Cl.
*B29C 45/74* (2006.01)
(52) U.S. Cl. .................... 73/700; 264/40.1; 425/144
(58) Field of Classification Search .............. 73/700; 425/144, 570, 149, 145; 264/40.1
See application file for complete search history.

(56) References Cited

U.S. PATENT DOCUMENTS

| | | | |
|---|---|---|---|
| 945,978 | A | 1/1910 | Nielsen et al. |
| 2,954,751 | A | 10/1960 | Barnes, Jr. |
| 3,411,475 | A | 11/1968 | Sheff |
| 3,785,332 | A | 1/1974 | Silverwater |
| 4,512,278 | A | 4/1985 | Winther |
| 4,721,589 | A * | 1/1988 | Harris ...................... 264/40.1 |
| 5,850,778 | A | 12/1998 | Fischbach |
| 6,286,997 | B1 | 9/2001 | Cunkelman et al. |
| 2006/0246167 | A1 * | 11/2006 | Buja ......................... 425/144 |

FOREIGN PATENT DOCUMENTS

DE 1274339 B1 8/1968

| | | | |
|---|---|---|---|
| JP | 2002361709 A | 12/2002 | |
| WO | WO2005003609 A | 1/2005 | |

OTHER PUBLICATIONS

"Striker Sensor", EXLINE, Inc., Salina, Kansas, USA, product brochure—publication date unknown, retrieved from Internet Dec. 2006 (per International Search Report).

* cited by examiner

*Primary Examiner*—Andre J. Allen
(74) *Attorney, Agent, or Firm*—John W. Gregg

(57) ABSTRACT

A pressure indicating fitting for injection molding equipment comprises a fitting body with a fitting bore therethrough, the fitting body being installed in the equipment with the fitting bore open to the interior of a passage for conveying melt, an indicating member received within the fitting bore and being bonded thereto to be retained in a normal position and being displaced therefrom to an indicating position by force from melt applied to the indicating member sufficient to cause the bond to fail, the indicating position determined by abutting contact of a surface of the indicating member with a surface of the fitting body and exposing a portion of a stem of the indicating member. Advantageously, the indicating member is retained in an indicating position by a press fit between the indicating member and fitting body. An injection molding manifold comprises a pressure indicating fitting in accordance with the invention.

19 Claims, 3 Drawing Sheets

APPARATUS FOR INDICATING PRESSURE

I. BACKGROUND OF THE INVENTION

1. Field of the Invention

This invention relates generally to apparatus for indicating pressure in excess of a predetermined value. In particular, this invention relates to apparatus for one-time use for indicating pressure in excess of a predetermined value.

2. Description of Related Art

Injection molding is a process for molding wherein material to be molded is conditioned to be flowable, the flowable material, hereinafter referred to as melt, is forced into mold cavities and allowed to solidify, and the solid articles are removed from the mold cavities. To achieve complete filling of mold cavities the melt is subjected to high forces, resulting in high pressure within the melt. Equipment for controlling the flow of melt to the mold cavities can be damaged by excessively high melt pressure. Damage may not be evident from the exterior of the equipment, and the first indication of damage may appear as defects in articles being molded. As a measure of quality control, equipment returned for repair or replacement is assessed for defects in material and workmanship. To reduce the cost of such assessments, it is desirable to know whether failed equipment has been subjected to conditions outside the specified operating range. It is therefore desirable to provide a pressure indicator for injection molding equipment that can provide an indication that the equipment has been subjected to excessive internal pressure.

Pressure indicating devices for use with pressurized fluids are known wherein an indicating member is retained in a reset position within a fitting by magnetic force and is driven to an indicating position when a sensed pressure produces sufficient force to overcome the magnetic force. In such indicating apparatus, the indicating member is driven to the indicating position by biasing means which maintain the indicating member in the indicating position even when sensed pressure is relieved. Such devices are known for use in conjunction with filters, the triggering of the indicator occurring when, due to contamination, a filter fails to pass a sufficient volume of fluid. With the filter replaced, the indicating member can be restored to the reset position where it will remain until sensed pressure is again sufficient to overcome the magnetic force. Because of the potential for damage to injection molding equipment from excessive melt pressure, it is desired that a pressure indicator not be restored to a normal condition except in connection with a thorough examination and/or repair or reconditioning of the equipment. Hence there remains a need for pressure indicating apparatus that is intended to continue to indicate an occurrence of excessive pressure until the indicating device is remanufactured or replaced.

SUMMARY OF THE INVENTION

It is an object of the present invention to provide an apparatus for indicating pressure of melt conveyed through a passage of injection molding equipment in excess of a predetermined limit comprising an indicating member bonded to a fitting, the bond being susceptible of failing with application of force from melt on the indicating member whereby the indicating member is displaced to an indicating position where a portion of a stem of the indicating member is exposed.

It is a further object of the present invention to provide an injection molding manifold comprising a passage for conveying melt from an injection unit to mold cavities, a pressure indicating fitting received in a manifold bore, the fitting comprising an indicating member bonded to the fitting, the bond being susceptible of failing with application of force from melt whereby the indicating member is displaced to an indicating position where a portion of a stem of the indicating member is exposed.

Further objects and advantages of the invention shall be made apparent from the accompanying drawings and the following description thereof.

In accordance with the aforesaid objects the present invention provides an apparatus for indicating pressure of melt conveyed through a passage of injection molding equipment in excess of a predetermined limit comprising a fitting having a fitting body with a fitting bore therethrough, the fitting body being installed in the equipment with the fitting bore open to the interior of the passage, an indicating member received within the fitting bore and being bonded thereto, the indicating member being maintained in a normal position by the bond and being displaced therefrom by force from melt applied to the indicating member sufficient to cause the bond to fail, the indicating member being displaced to an indicating position determined by abutting contact of a surface of the indicating member with a surface of the fitting body, a portion of a stem of the indicating member being exposed with the indicating member in the indicating position. An injection molding manifold is provided comprising a passage for conveying melt from an injection unit to mold cavities and a pressure indicating apparatus in accordance with the invention. Advantageously, the indicating member of the pressure indicating apparatus is retained in an indicating position by a press fit between the indicating member and the fitting body.

DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Figure 1A:
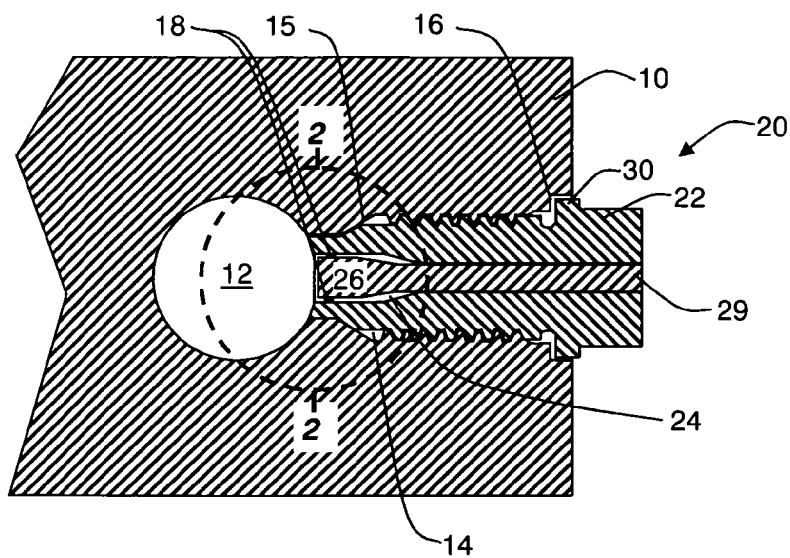
FIGS. 1a and 1b illustrate a pressure indicating device in accordance with the invention.
Figure 1B:
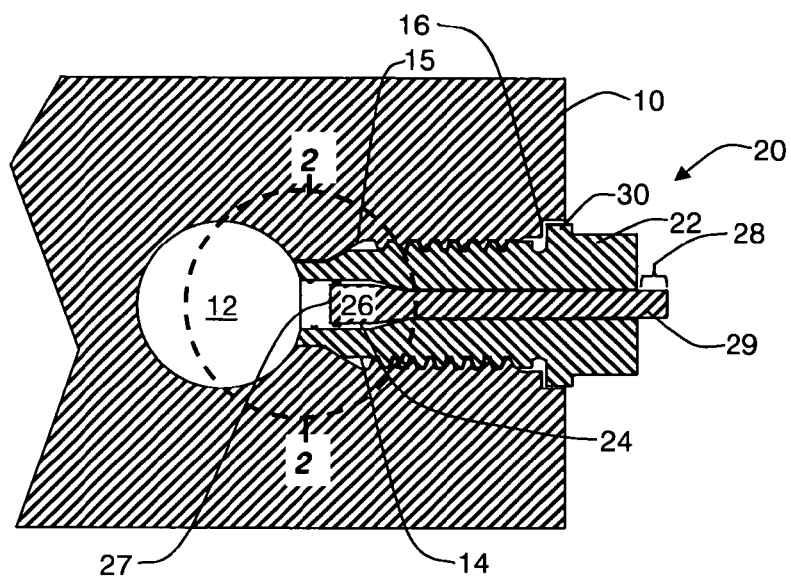

Referring to FIGS. 1a and 1b, a portion of a melt conveying manifold 10 comprises passage 12 for conveying melt from an injection unit (not shown) to mold cavities (not shown) of equipment for injection molding. An expected operating temperature range establishing an operating environment for pressure indicating apparatus in accordance with the invention is related to the type of material being injection molded. An expected operating temperature for manifold 10 when used for conveying polymer melt is in the range of from about 370° F. to about 650° F. Pressure indicating fitting 20 is installed in manifold bore 14 of manifold 10 so that fitting bore 24 through fitting body 22 is open to the interior of passage 12. Advantageously, a portion of the exterior of fitting body 22 is threaded to engage threads in manifold bore 14. As shown, fitting body 22 seats against taper 15 before flange 30 abuts counterbore 16 of manifold bore 14. Seating of fitting body 22 against taper 15 seals manifold bore 14 preventing melt conveyed through passage 12 from exiting manifold 10 through manifold bore 14. Indicating member 26 is received within fitting bore 24 and is bonded therein so that indicating segment 28 of indicating member 26 is substantially surrounded by fitting body 22. Bond 18 spans the annular gap between piston end 27 of indicating member 26 and fitting bore 24. Materials of fitting body 22, indicating member 26 and bond 18 are chosen according to the contemplated operating temperature range to function as intended.

Continuing with reference to FIGS. 1a, 1b, 2a and 2b, when force applied to the end of indicating member 26 exposed to the interior of passage 12 exceeds the yield strength of bond 18, bond 18 fails and indicating member 26 is driven within fitting bore 24 away from passage 12. In use, melt pressure applies a force on indicating member 26 as a function of the area of piston end 27 exposed to melt within passage 12. The effective area of piston end 27 and the yield strength of bond 18 are used to establish a predetermined melt pressure at which bond 18 will fail releasing indicating member 26 to be driven to the indicating position illustrated in FIGS. 1b and 2b. Displacement of indicating member 26 away from passage 12 is limited by abutting contact of a surface of piston end 27 such as taper 25 with an opposing surface of fitting body 22 such as transition 17.

Advantageously stem 29 of indicating member 26 is closely fit with the portion of fitting bore 24 in which it is supported so as to prevent passage of melt around stem 29 without affecting the force required to effect failure of bond 18. With indicating member 26 in the indicating position, an internal seal is achieved by circumferential contact of piston end 27 with the interior of fitting bore 24. As illustrated in FIGS. 1a, 1b, 2a and 2b, indicating member 26 comprises a taper 25 between piston end 27 and stem 29. Taper 25 makes sealing contact with transition 17 of fitting bore 24 when indicating member 26 is in the indicating position illustrated in FIGS. 1b and 2b.

Figure 2A:
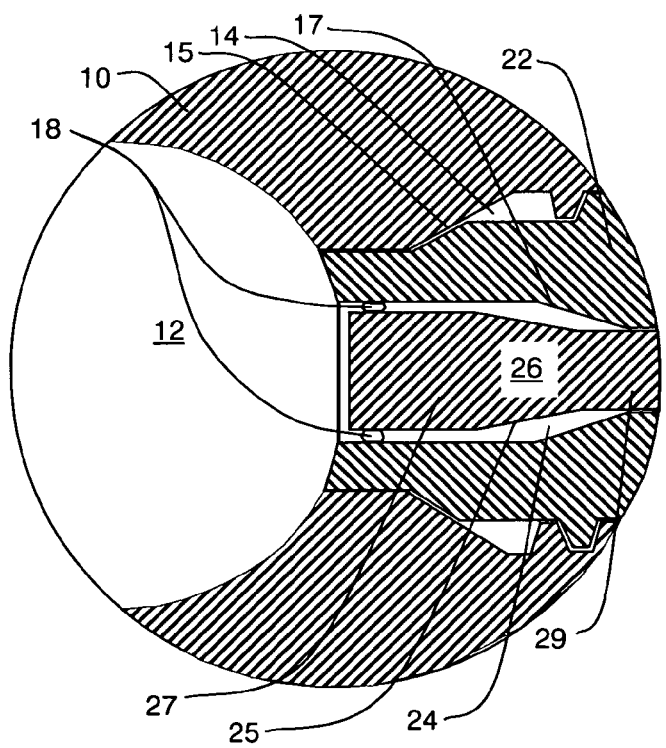
FIGS. 2a and 2b are enlarged views of portions of the pressure indicator device of FIGS. 1a and 1b.
Figure 3A:
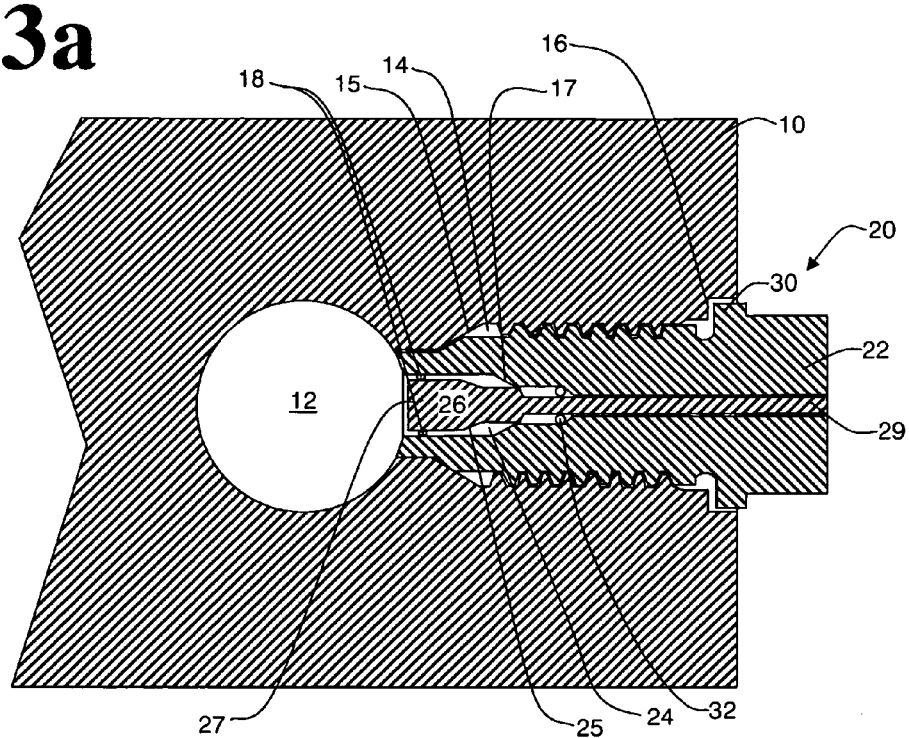
FIGS. 3a and 3b are alternative arrangements of pressure indicators in accordance with the invention.
Figure 3B:
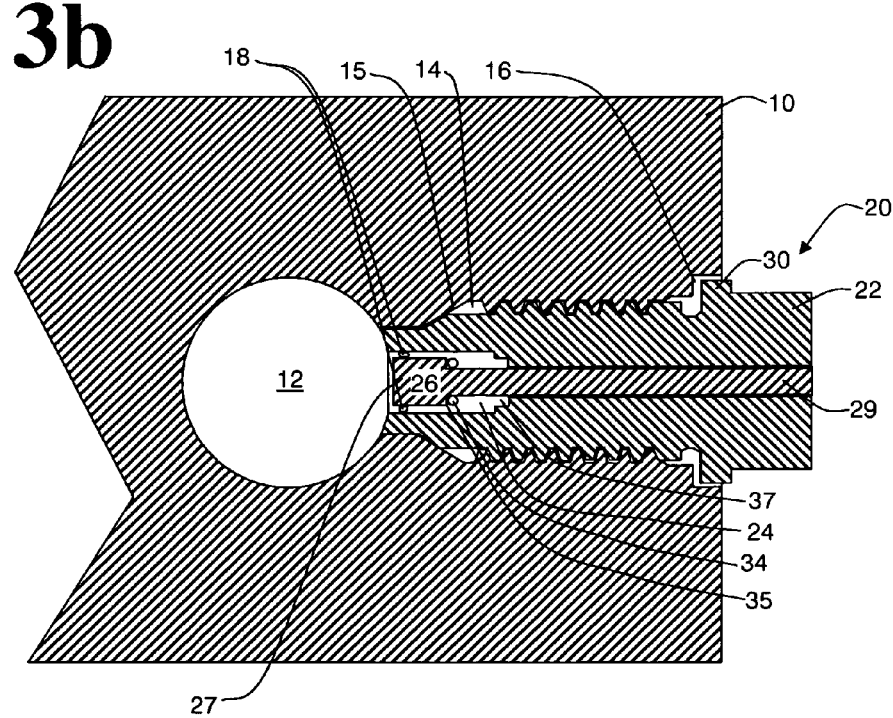

Alternative arrangements of piston end 27, stem 29 and fitting bore 24 are illustrated in FIGS. 3a, and 3b wherein components corresponding to components of FIGS. 1a and 2a have the same reference numbers. Referring to FIG. 3a, ring seal 32 is fitted within fitting bore 24 and surrounding stem 29 at the entry of the portion of fitting bore 24 in which stem 29 is supported. Upon displacement of indicating member 26 to the indicating position, piston end 27 contacts ring seal 32 sealing the entry of the stem support portion of fitting bore 24. Melt by-passing piston end 27 is prevented from passing out of fitting 20 by the sealing contact of piston end 27, ring seal 32 and fitting bore 24. Referring to FIG. 3b, ring seal 34 is fitted to indicating member 26 adjacent to piston end 27 and surrounding stem 29. Upon displacement of indicating member 26 to the indicating position, ring seal 34 makes sealing contact with fitting bore 24 proximate the entry of the stem support portion thereof. Melt by-passing piston end 27 is prevented from passing out of fitting 20 by the sealing contact between ring seal 34, piston end 27 and fitting bore 24.

Indicating member 26 is advantageously retained in the indicating position by a press fit of a portion of indicating member 26 with a portion of fitting body 22. The press fit is achieved, for example, between the taper 25 of indicating member 26 and transition 17 of fitting bore 24 illustrated in FIGS. 2a, 2b and 3a or by the stepped reduction 35 from piston end 27 to stem 29 and opposing stepped recess 37 of fitting bore 24 illustrated in FIG. 3b. The press fit advantageously insures that indicating member 26 is retained in the indicating position after reduction of pressure to which the exposed face of piston end 27 is exposed. In the event the indicating member 26 is restored to its original position after bond 18 has failed, application of normal operating pressure to the exposed face of piston end 27 is sufficient to drive indicating member 26 to the indicating position, hence insuring continuing indication of the occurrence of an excessive internal pressure.

Referring to FIGS. 1a, 1b, 2a and 2b, indicating member 26 is advantageously bonded to fitting body 22 by brazing. Where fitting body 22 and indicating member 26 are steel, brazing material is advantageously a nickel alloy, such as American Welding Society specification BNi-5 (Society of Automotive Engineers Aerospace Material Specification 4782). Other brazing materials suitable for joining steel may be used. Where fitting body 22 and indicating member 26 are made of other metals or dissimilar metals, brazing material is selected to achieve the desired bond strength with the selected metals within the contemplated operating temperature range. To achieve an effective bond volume, brazing is advantageously accomplished by applying brazing material as a coating, paste, foil, tape or other form to a portion of the surface of one or both of indicating member 26 and fitting bore 24 where the bond is to be formed prior to assembly, and heating the assembled fitting 20 to the brazing temperature of the brazing material. Alternatively, conventional brazing may be used wherein brazing wire or rod is thermally liquefied to flow by capillary action into the annular gap between indicating member 26 and fitting bore 24. To control bond volume within the gap an enlarged annular gap between indicating member 26 and fitting bore 24 is created at the location beyond which it is desired to prevent flow of liquefied braze material.

Figure 2B:
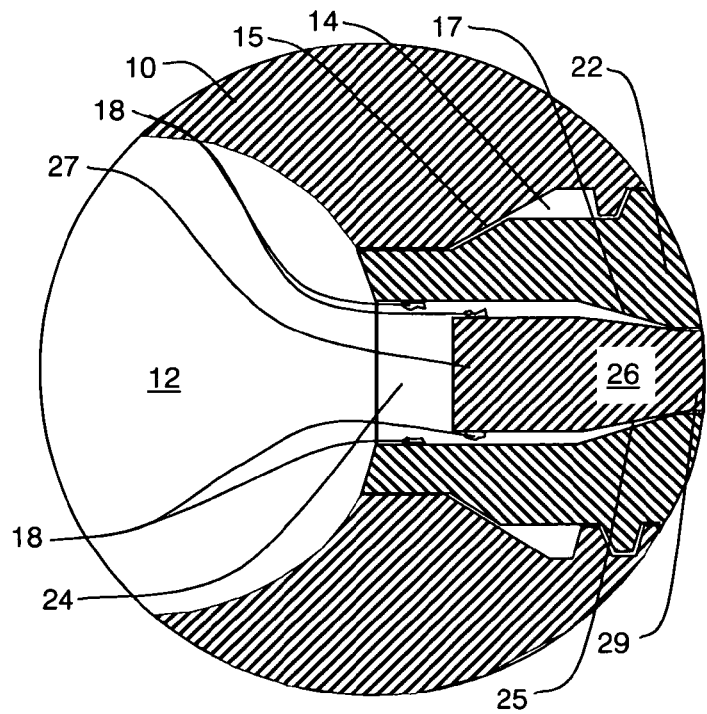

While the pressure indicator of the preferred embodiment has been described as comprising a fitting body 22 and indicating member 26 of metal, other materials may be used for these elements. Where one of fitting body 22 and indicating member 26 are ceramic and the other metal, bond 18 may be a brazing alloy of silver, copper, nickel or cobalt according to the materials being joined. Likewise, if fitting body 22 and/or indicating member 26 are made of materials comprising polymers, bond 18 may be adhesives suitable for joining the materials thereof and exhibiting a desired bond strength at the contemplated operating temperatures. While FIGS. 2a and 2b illustrate failure of the bond as rupture of the bond material, other modes of failure may prevail depending on the materials being bonded and the material of the bond. For example, the bond may separate from either of indicating member 26 and fitting body 22 releasing indicating member 26, or a combination of partial separation of the bond from the members it joins and partial rupture of the bond may occur. To be suitable for use in the invention, it is required only that the effective mode of failure of the bond occurs consistently at a predetermined pressure acting on the exposed face of piston end 27.

What is claimed is:

1. An apparatus for indicating pressure of melt conveyed through a passage of injection molding equipment in excess of a predetermined limit comprising a fitting having a fitting body with a fitting bore therethrough, the fitting body being installed in the equipment with the fitting bore open to the interior of the passage, an indicating member received within the fitting bore and being bonded thereto, the indicating member being maintained in a normal position by the bond and being displaced therefrom by force from melt applied to the indicating member sufficient to cause the bond to fail, the indicating member being displaced to an indicating position determined by abutting contact of a surface of the indicating member with an opposing surface of the fitting body, a portion of a stem of the indicating member being exposed with the indicating member in the indicating position.

2. The apparatus according to claim 1 wherein the indicating member comprises a piston end having an exposed face proximate the end of the fitting bore open to the passage and the fitting bore defines an annular gap between the piston end and the fitting body, the indicating member being bonded to the fitting body by a bond spanning the annular gap.

3. The apparatus according to claim 2 wherein the indicating member and fitting body are metal and the indicating member is bonded to the fitting body by brazing.

4. The apparatus according to claim 3 wherein the indicating member and the fitting body are steel and the braze is a nickel alloy.

5. The apparatus according to claim 2 wherein the abutting contact of the indicating member and sealing body seals the fitting bore to prevent melt bypassing the piston end from passing out of the fitting body.

6. The apparatus according to claim 5 wherein the indicating member comprises a taper between the piston end and the stem and the fitting bore comprises a transition and the taper makes abutting contact with the transition.

7. The apparatus according to claim 5 wherein the indicating member comprises a stepped reduction from the piston end to the stem and the stepped reduction makes abutting contact with a stepped recess of the fitting bore.

8. The apparatus according to claim 2 further comprising a sealing member for forming a seal between the indicating member and the fitting body to prevent melt bypassing the piston end from passing out of the fitting body.

9. The apparatus according to claim 2 wherein the area of the exposed face is selected so that melt pressure acting thereon in excess of a predetermined value produces a force sufficient to cause failure of the bond and after failure of the bond, normal melt pressure acting thereon produces a force sufficient to displace the indicating member to the indicating position.

10. The apparatus according to claim 1 wherein the indicating member is retained in the indicating position by a press fit between the indicating member and the fitting body.

11. An Injection molding manifold comprising a passage for conveying melt from an injection unit to mold cavities, a pressure indicating fitting received in a manifold bore, the fitting comprising a fitting body with a fitting bore therethrough, the fitting body being installed in the manifold with the fitting bore open to the interior of the passage, an indicating member received within the fitting bore and being bonded thereto, the indicating member being maintained in a normal position by the bond and being displaced therefrom by force from melt applied to the indicating member sufficient to cause the bond to fail, the indicating member being displaced to an indicating position determined by abutting contact of a surface of the indicating member with an opposing surface of the fitting body, a portion of a stem of the indicating member being exposed with the indicating member in the indicating position.

12. The manifold according to claim 11 wherein the indicating member comprises a piston end having an exposed face proximate the end of the fitting bore open to the passage and the fitting bore defines an annular gap between the piston end and the fitting body, the indicating member being bonded to the fitting body by a bond spanning the annular gap.

13. The manifold according to claim 12 wherein the indicating member and fitting body are metal and the indicating member is bonded to the fitting body by brazing.

14. The manifold according to claim 12 wherein the abutting contact of the indicating member and sealing body seals the fitting bore to prevent melt bypassing the piston end from passing out of the fitting body.

15. The manifold according to claim 14 wherein the indicating member comprises a taper between the piston end and the stem and the fitting bore comprises a transition and the taper makes abutting contact with the transition.

16. The manifold according to claim 14 wherein the indicating member comprises a stepped reduction from the piston end to the stem and the stepped reduction makes abutting contact with a stepped recess of the fitting bore.

17. The manifold according to claim 12 further comprising a sealing member for forming a seal between the indicating member and the fitting body to prevent melt bypassing the piston end from passing out of the fitting body.

18. The manifold according to claim 12 wherein the area of the exposed face is selected so that melt pressure acting thereon in excess of a predetermined value produces a force sufficient to cause failure of the bond and after failure of the bond, normal melt pressure acting thereon produces a force sufficient to displace the indicating member to the indicating position.

19. The manifold according to claim 11 wherein the indicating member is retained in the indicating position by a press fit between the indicating member and the fitting body.

\* \* \* \* \*